No. 733,169. PATENTED SEPT. 8, 1903.
J. A. DODD.
COTTON AND CANE CULTIVATOR.
APPLICATION FILED OCT. 18, 1902.
NO MODEL. 2 SHEETS—SHEET 1.

Witnesses
J. P. Britt
Harry Ellis Chandler

Inventor
J. A. Dodd,
By Chandler & Chandler
Attorneys

THE NORRIS PETERS CO., PHOTO-LITHO., WASHINGTON, D. C.

No. 738,169. PATENTED SEPT. 8, 1903.
J. A. DODD.
COTTON AND CANE CULTIVATOR.
APPLICATION FILED OCT. 18, 1902.
NO MODEL. 2 SHEETS—SHEET 2.

Witnesses
F. P. Britt
Harry Ellis Chandlee

Inventor
J. A. Dodd
By Chandlee & Chandlee
Attorneys

No. 738,169.

Patented September 8, 1903.

UNITED STATES PATENT OFFICE.

JOHN A. DODD, OF FORT WORTH, TEXAS.

COTTON AND CANE CULTIVATOR.

SPECIFICATION forming part of Letters Patent No. 738,169, dated September 8, 1903.

Application filed October 18, 1902. Serial No. 127,877. (No model.)

*To all whom it may concern:*

Be it known that I, JOHN A. DODD, residing at Fort Worth, in the county of Tarrant, State of Texas, have invented certain new and useful Improvements in Cotton and Cane Cultivators; and I do hereby declare the following to be a full, clear, and exact description of the invention, such as will enable others skilled in the art to which it appertains to make and use the same.

This invention relates to cultivators, and more particularly to that class designed for cultivating cotton and cane; and it has for its object to provide a simple and efficient implement including a laterally-movable hoe having teeth arranged in advance thereof to harrow the ground and provide a smooth surface for the supporting-wheels to run on and plows disposed to treat the ground behind the hoe.

A further object of the invention is to provide a simple mechanism for actuating the hoe and which may be thrown into and out of action when desired.

Figure 1:
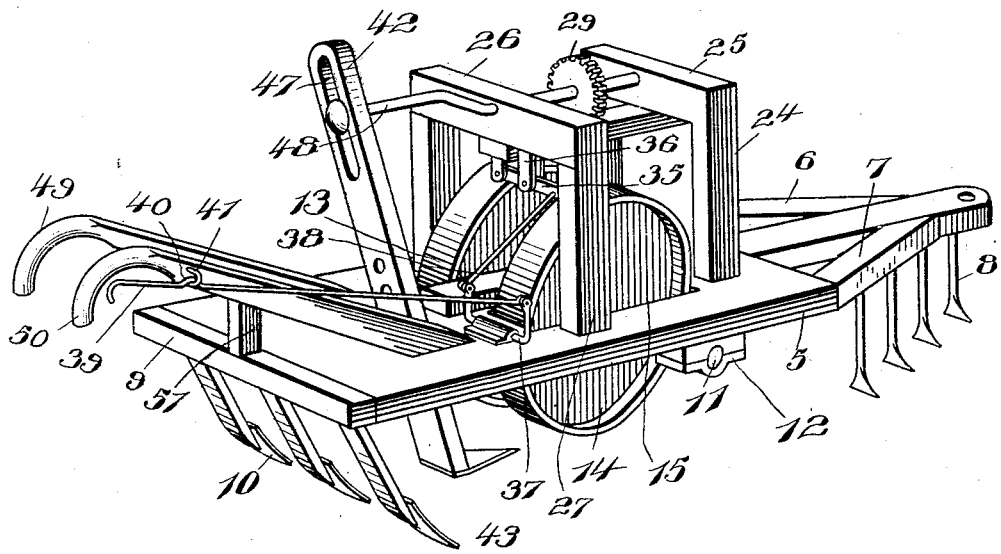
Figure 2:
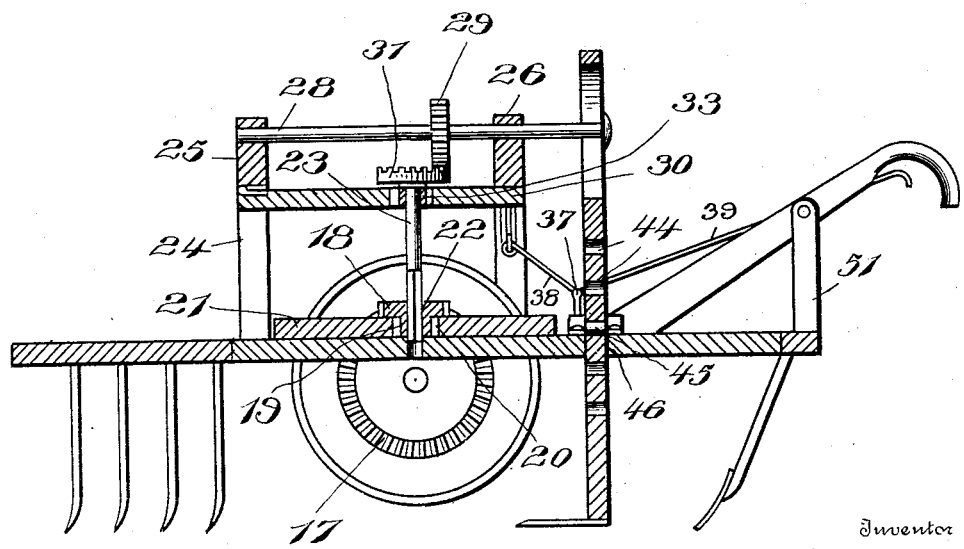
Figure 3:
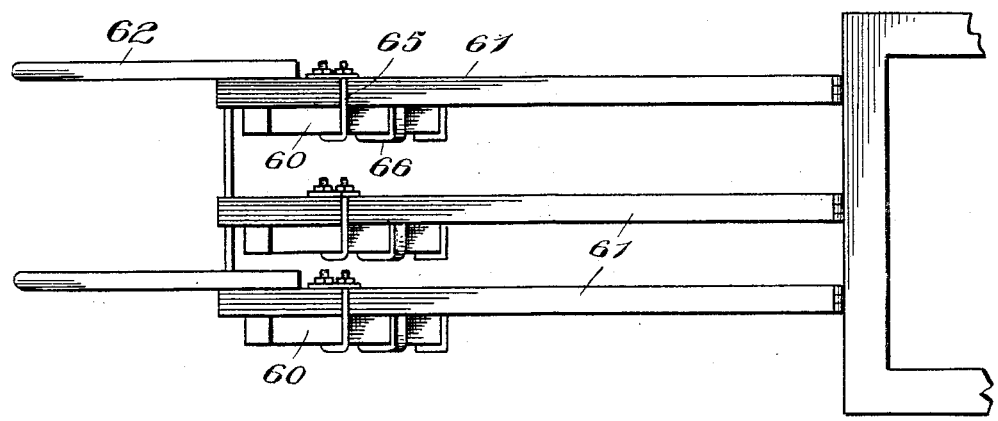
Figure 4:
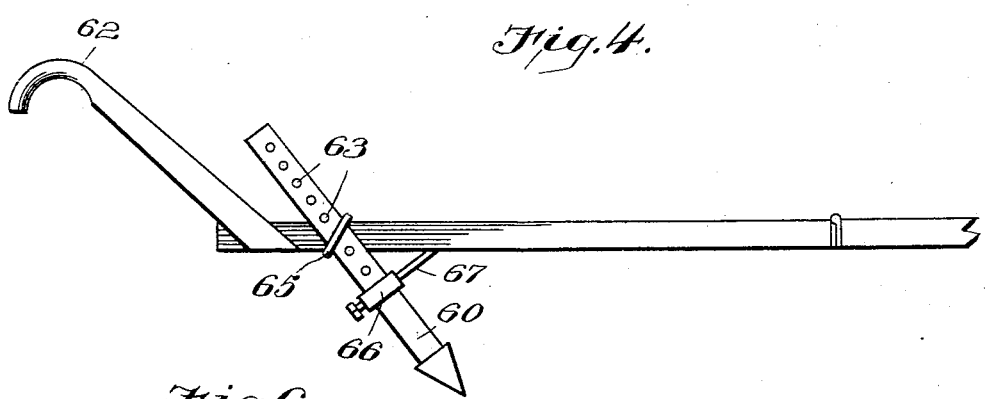
Figure 6:
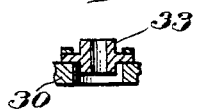
Figure 5:
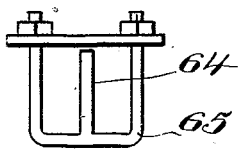

Other objects and advantages of the invention will be understood from the following description:

In the drawings forming a portion of this specification, and in which like numerals of reference indicate similar parts in the several views, Figure 1 is a rear perspective view of the implement. Fig. 2 is a vertical section taken longitudinally through the machine and showing the mechanism for throwing the machine out of gear. Fig. 3 is a top plan view showing a different arrangement of cultivator-shovels. Fig. 4 is a side elevation of one of the supplemental beams with its attached cultivator-shovel. Fig. 5 is a detail elevation of a clip. Fig. 6 is a transverse section through the pivoted support and showing the pivoted bearing carried thereby.

Referring now to the drawings, the present implement comprises a platform 5, including the forward beams 6 and 7, which converge forwardly and in which are engaged the harrow-teeth 8, while to the rear beam 9 of the frame are connected the cultivator-shovels 10. Between the harrow-teeth and the cultivator-shovels and transversely of the under side of the platform is mounted a shaft 11 in bearings 12, and this shaft carries the two supporting-wheels 13 and 14, which project above the platform through slots 15 therein, and on the inner face of the wheel 14 is a crown-gear 17, with which engages a pinion 18 for rotation thereby. The pinion 18 has an integral sleeve 19, mounted in a bearing 20 on the central sill 21 of the platform, and through the gear and its sleeve is an angular opening 22, which receives the squared lower portion of the shaft 23, which is vertically adjustable therethrough for a purpose to be presently explained.

At the forward end of the platform are the uprights 24, that support a pillow-block 25, there being a second pillow-block 26, supported upon the uprights 27 at the rear of the supporting-wheels. In the pillow-blocks is journaled the shaft 28, which carries a pinion 29.

Hinged to the pillow-block 25 between its supports is a beam 30, in which is journaled the upper portion of the vertical shaft above referred to, and which shaft carries a crown-gear 31 above the beam and adapted to mesh with the pinion on the horizontal shaft. When the beam 30 is raised at its rear end, the crown-gear is engaged with the pinion, and when said beam is lowered the crown-gear is disengaged from the pinion. As the beam 30 is swung vertically on its hinge, the angle between said beam and the shaft 23 varies, and to prevent said shaft from pinching in its bearing in said beam said bearing (shown at 33) is pivotally mounted in the beam.

To raise and lower the beam 30, a lever 35 is pivoted at one end to the rear end of the beam and is fulcrumed in the hanger 36, which depends from the rear pillow-block 26, the opposite end of this lever being connected to one arm of a bell-crank lever 37 upon the platform 5 through the medium of the connecting-rod 38. An operating-rod 39 is connected with the opposite arm of the bell-crank lever for rocking the latter, and it will be noted that as the bell-crank lever is rocked the beam will be raised and lowered. The operating-rod may have bends 40 therein to form, in effect, notches to receive a side of the staple 41, through which the rod is passed to hold the rod in its shifted positions.

The shafts and gearing above described are designed to operate a hoe, which consists of the staff 42, having a laterally-extending blade 43 at its lower end. This staff has a longitudinal series of perforations 44 therein to interchangeably receive a shaft 45, mounted upon the platform 5 to hold the staff with the blade at different elevations and permit of lateral swinging movement of the blade, the staff being passed through an opening 46 in the platform. In the staff is a longitudinal slot 47, in which is slidably engaged one end of a crank 48, secured to the horizontal shaft 28. Thus when the implement is drawn forwardly, as by a team attached to the central draft-beam, the supporting-wheels will be rotated to oscillate the hoe, and by adjusting the staff of the hoe vertically through the platform the depth at which the hoe works, as also the length of its arc of movement, will be increased.

Attached to the rear portion of the upper face of the platform 5 are the handles 49 and 50 in the form of the ordinary plow-handles, which are braced by means of the post 51.

In Fig. 3 of the drawings there is shown a construction wherein the cultivator-shovels are attached to the lower ends of stocks 60, connected to beams 61, which latter are pivotally connected or hinged to the rear end of the frame of the implement to permit of raising of the rear ends of the beams through the medium of the handles 62, attached thereto, so that the shovels may be raised from engagement with any trash that may collect on them. Each stock is provided with transverse perforations 63 for engagement by the spike 64 of a clip 65, which is engaged with the corresponding beam, and when the clip is released the stock may be adjusted to hold the shovel at the desired point below the beam. Upon the lower portion of each stock is a collar 66, connected by a brace-rod 67 with the corresponding beam, and through which collar the stock may be slid, movement of the stock through the collar being prevented when desired by means of a set-screw.

It will be seen that in the use of this implement the ground will be first harrowed, then hoed, and finally treated by the cultivator-shovel, and that at any time during the progress of the implement operation of the hoe may be stopped or the cultivators may be raised to skip obstructions.

It will be understood that in practice other modifications may be made and that any suitable materials and proportions may be used for the various parts without departing from the spirit of the invention.

What is claimed is—

1. A cultivating implement comprising a platform having supporting-wheels one of which is provided with a gear, a second gear carried by the platform and meshing with the first-named gear, a vertical shaft slidably engaged with the gear on the platform and with which gearing the shaft is rotatable, a gear fixed to the upper end of the vertical shaft, pillow-blocks supported upon the platform, a crank-shaft mounted in the pillow-blocks and provided with a pinion, a vertically-movable support, a bearing carried by the support and in which the vertical shaft is journaled and with which said shaft and its upper gear are movable to carry said gear into and out of engagement with the pinion on the crank-shaft, and a hoe pivoted in the platform and having a slot in which the crank of the shaft is engaged.

2. A cultivating implement comprising a platform having supporting-wheels one of which is provided with a gear, pillow-blocks supported upon the platform, a crank-shaft mounted in the pillow-blocks and provided with a pinion, a support hinged to one of the pillow-blocks, a lever pivoted to the other pillow-block and connected with the support for raising and lowering it, a bell-crank lever upon the platform, a rod connecting the bell-crank lever and pivoted lever, a shift-rod connected to the bell-crank lever, a gear carried by the support and movable therewith into and out of engagement with the pinion on the crank-shaft, a shaft slidably engaged with said gear and having a gear engaged with the gear of the supporting-wheel, and a hoe pivoted in the platform and operatively connected with the crank-shaft.

In testimony whereof I affix my signature in presence of two witnesses.

J. A. DODD.

Witnesses:
J. W. MOORE,
H. D. DODD.